United States Patent
Srinivasan

(10) Patent No.: US 12,190,911 B2
(45) Date of Patent: *Jan. 7, 2025

(54) METHODS AND APPARATUS TO PERFORM SPEED-ENHANCED PLAYBACK OF RECORDED MEDIA

(71) Applicant: The Nielsen Company (US), LLC, New York, NY (US)

(72) Inventor: Venugopal Srinivasan, Tarpon Springs, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/544,650

(22) Filed: Dec. 19, 2023

(65) Prior Publication Data

US 2024/0127854 A1    Apr. 18, 2024

Related U.S. Application Data

(63) Continuation of application No. 17/688,736, filed on Mar. 7, 2022, now Pat. No. 11,869,542, which is a continuation of application No. 17/099,385, filed on Nov. 16, 2020, now Pat. No. 11,270,735, which is a continuation of application No. 15/947,638, filed on Apr. 6, 2018, now Pat. No. 10,839,854, which is a
(Continued)

(51) Int. Cl.
*G11B 27/00*     (2006.01)
*G10L 21/045*    (2013.01)
*G10L 21/055*    (2013.01)
*G11B 27/19*     (2006.01)

(52) U.S. Cl.
CPC .......... *G11B 27/005* (2013.01); *G10L 21/045* (2013.01); *G10L 21/055* (2013.01); *G11B 27/19* (2013.01)

(58) Field of Classification Search
CPC ..... G11B 27/005; G11B 27/19; G10L 21/045; G10L 21/055
USPC ........ 386/343–352, 318; 725/102; 369/47.28
See application file for complete search history.

(56) References Cited

U.S. PATENT DOCUMENTS

| | | | |
|---|---|---|---|
| 5,809,454 A * | 9/1998 | Okada ................... | G10L 21/04 704/208 |
| 7,480,446 B2 * | 1/2009 | Bhadkamkar .......... | G11B 27/10 348/E5.009 |
| 11,869,542 B2 * | 1/2024 | Srinivasan ............. | G11B 27/19 |

(Continued)

FOREIGN PATENT DOCUMENTS

WO    WO-2005096300 A1 *   10/2005   ........... G11B 27/005

*Primary Examiner* — Thai Q Tran
*Assistant Examiner* — Stephen R Smith

(57) ABSTRACT

Methods, apparatus, systems, and articles of manufacture to perform speed-enhanced playback of recorded media are disclosed. Example apparatus to playback media disclosed herein comprise at least one memory, machine-readable instructions, and processor circuitry to execute the machine-readable instructions to parse an audio frame included in the media to determine a number of skip bytes included in the audio frame, compare the number of skip bytes to a threshold, associate the audio frame with a plurality of candidate frames identified in the media when the number of skip bytes satisfies the threshold, and calculate a speed-enhanced playback rate for the media based on the plurality of candidate frames identified in the media.

20 Claims, 6 Drawing Sheets

Related U.S. Application Data continuation of application No. 15/251,561, filed on Aug. 30, 2016, now Pat. No. 9,940,968.

(56) References Cited

U.S. PATENT DOCUMENTS

| | | | | |
|---|---|---|---|---|
| 2008/0131075 A1* | 6/2008 | Pontual | ............... | H04N 5/76 |
| | | | | 386/343 |
| 2012/0057843 A1* | 3/2012 | Otani | ............... | G11B 27/005 |
| | | | | 386/224 |
| 2013/0148940 A1* | 6/2013 | Schmit | ............... | H04N 5/783 |
| | | | | 386/230 |
| 2014/0186014 A1* | 7/2014 | Wordley | ............ | H04N 19/40 |
| | | | | 386/345 |
| 2015/0332732 A1* | 11/2015 | Gilson | ............ | G11B 27/036 |
| | | | | 386/240 |
| 2017/0195700 A1* | 7/2017 | Jin | ............. | H04N 21/234381 |
| 2018/0063008 A1* | 3/2018 | Hammarqvist | ...... | H04L 43/087 |

* cited by examiner

METHODS AND APPARATUS TO PERFORM SPEED-ENHANCED PLAYBACK OF RECORDED MEDIA

CROSS-REFERENCE TO RELATED APPLICATIONS

The present disclosure is a continuation of U.S. patent application Ser. No. 17/688,736 (now U.S. Pat. No. 11,869,542), filed on Mar. 7, 2022, which is a continuation of U.S. patent application Ser. No. 17/099,385 (now U.S. Pat. No. 11,270,735), filed on Nov. 16, 2020, which is a continuation of U.S. patent application Ser. No. 15/947,638 (now U.S. Pat. No. 10,839,854), filed on Apr. 6, 2018, which is a continuation of U.S. patent application Ser. No. 15/251,561 (now U.S. Pat. No. 9,940,968), filed on Aug. 30, 2016, each of which is incorporated by reference in its entirety.

FIELD OF THE DISCLOSURE

This disclosure relates generally to media presentation, and, more particularly, to methods and apparatus to perform speed-enhanced playback of recorded media.

BACKGROUND

Traditionally, broadcast programs have been consumed via a media presentation device at which the broadcast programs are received. However, more recently, recording devices such as set-top boxes (STB), digital video recorders (DVR), personal video recorders (PVR), game consoles, etc., which permit media to be recorded and replayed in accordance with the desires of individual audience members, have become commonplace.

BRIEF DESCRIPTION OF THE DRAWINGS

Wherever possible, the same reference numbers will be used throughout the drawing(s) and accompanying written description to refer to the same or like parts.

DETAILED DESCRIPTION

In general, the example apparatus and methods described herein may be used to perform speed-enhanced playback of recorded media. Examples disclosed herein include a digital recording/playback device at a consumption site that allows a consumer to playback media at a faster rate than the rate at which the media was originally recorded or broadcast. For example, the example digital recording/playback device disclosed herein may enable a consumer to playback media at a rate thirty percent faster (e.g., 1.3×) than the original playback rate (e.g., 1.0×).

Examples disclosed herein facilitate speeding-up playback of previously recorded media. For example, disclosed techniques include dropping audio frames, and corresponding video frames, having a number of skip bytes that satisfy a target threshold. As used herein, an "audio frame" refers to a block of data representing time-domain audio in a compressed format. In some examples, the target threshold number of skip bytes is computed to drop a target percentage of audio frames by evaluating the number of skip bytes of the audio frames of the recorded media. Audio frames with a qualifying number of skip bytes (e.g., that satisfy a skip bytes threshold) are identified as candidate frames for dropping that may be dropped during playback to perform speed-enhanced playback. In some examples, the number of audio frames that are dropped depends on the target playback rate. For example, if recorded media includes 256 audio frames, and a playback rate thirty percent faster (e.g., 1.3×) than the original playback rate (e.g., 1.0×) is desired, examples disclosed herein select approximately 61 audio frames to drop to facilitate a playback rate of 1.3×.

Figure 1:
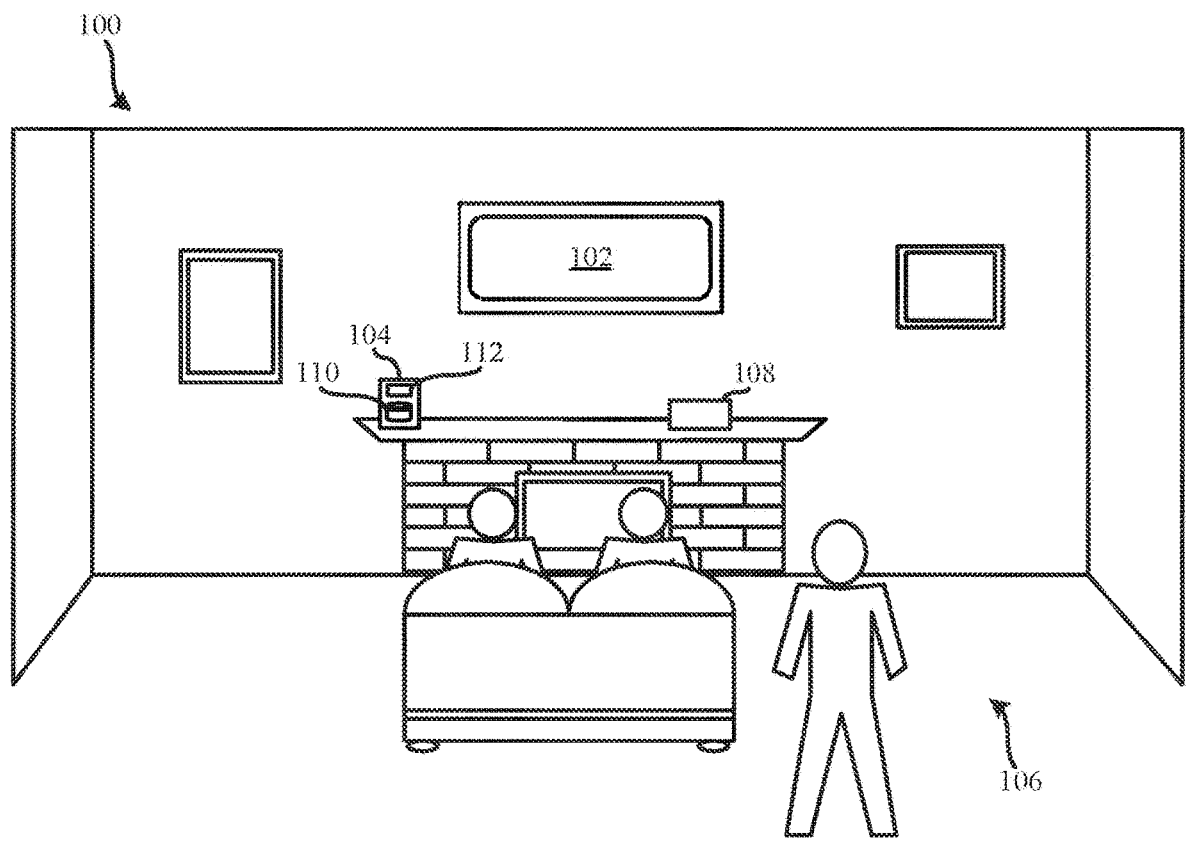
FIG. 1 illustrates an example system for media playback implemented in accordance with the teachings of this disclosure to perform speed-enhanced playback of recorded media.

FIG. 1 is an illustration of an example media exposure environment 100 including a media presentation device 102 and an example digital recording/playback device 104 for performing speed-enhanced playback of recorded media to an audience 106 of the media presentation device 102. In the illustrated example of FIG. 1, the media exposure environment 100 is a room of a household. The example digital recording/playback device 104 can be implemented in additional and/or alternative types of environments such as, for example, a theater, a restaurant, a tavern, a store, an arena, etc. For example, the environment may be an environment associated with a purchase of a media presentation device such as an XBOX®. In the illustrated example of FIG. 1, the media presentation device 102 is a television coupled to a video game console 108 and the digital recording/playback device 104 that implements a digital video recorder (DVR) and a digital versatile disc (DVD) player. The example digital recording/playback device 104 can be implemented in connection with additional and/or alternative types of media presentation devices such as, for example, a radio, a computer monitor, an over-the-top device, and/or any other communication device able to present media to one or more individuals via any past, present or future devices (e.g., broadcast television, analog television, digital television, satellite broadcast, Internet, cable, etc.).

Digital broadcast systems typically transmit one or more high-bandwidth signals, each of which is typically composed of a stream of data or data packets having a plurality of video, audio and/or other digital programs or content multiplexed therein. A number of well-known data compression techniques (e.g., audio/video content compression techniques), transmission protocols and the like are typically employed to generate and transmit a multi-program data stream or bit stream, which is commonly referred to as a transport stream. In particular, digital television programming is typically transmitted according to a standard promulgated by the Advanced Television Standards Committee (ATSC). The ATSC standard is a comprehensive standard relating to the conveyance of digital television signals. Under the ATSC standard, video information associated with a program is encoded and compressed according to the well-known Moving Pictures Expert Group-2 (MPEG-2) standard and audio information associated with the program is encoded and compressed according to the well-known AC-3 standard. As a result, an ATSC data stream or bit stream contains video information in the form of MPEG-2 packets and audio information in the form of AC-3 packets. However, other digital transmission protocols, data compression schemes and the like may be used instead.

As described above, the disclosed digital broadcast streams use AC-3 packets to communicate audio information. The AC-3 packets contain the actual audio data and headers containing additional information such as synchronization information, timing information and sampling rate information. The AC-3 data stream is organized into frames and each frame contains sufficient data to reconstruct audio corresponding approximately to the duration of a video frame. Each frame has a fixed size in terms of total number of 16-bit words. During the rendering (e.g., playback) process, each audio frame is time-aligned with its corresponding video frame to achieve lip synchronization.

In the case of 48 KHz-sampled audio with 16-bits per sample, each AC-3 frame represents 6 blocks of compressed audio. In the illustrated example, each block is derived from 256 time-domain samples per channel. The number of channels can vary between 1 (e.g., monophonic audio) to 6 (e.g., "5.1 channel surround sound"). A multi-pass algorithm attempts to compress the data from each 256-sample block of audio in order to minimize the number of bits required to represent it. Since the frame size is fixed, at the end of the optimization process, one or more bytes may be available as "surplus." In the bit stream, the presence of the "surplus" bits is identified by a "skip length exists" flag (e.g., "SKIPLE"). If the SKIPLE bit is a "1," then dummy bytes are included in the frame. The frame also includes a 9-bit "skip length" code (e.g., "SKIPL") that defines the number of bytes to skip at this point in the stream during playback. The skip bytes are generally inserted immediately after the compressed representations of a block of audio in the form of Modified Discrete Cosine Transform (MDCT) coefficients. Examples disclosed herein parse an AC-3 frame to identify the total number of skip bytes in the data stream by locating the "skip length exists" flags and the "skip length" codes. In the illustrated example, each AC-3 frame, when uncompressed by an AC-3 decoder, will yield 1536 time-domain samples for each channel. The playback duration of such a frame is 32 milliseconds.

The example digital recording/playback device 104 of FIG. 1 includes a media database 110 to store digital media (e.g., an ATSC data stream or bit stream) recorded by the digital recording/playback device 104. For example, a user may select to record digital broadcast media and/or schedule the digital recording/playback device 104 to record digital broadcast media at a particular time. The example digital recording/playback device 104 records the selected media in the example media database 110.

The example media database 110 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example media database 110 may additionally or alternatively be implemented by one or more double data rate (DDR) memories, such as DDR, DDR2, DDR3, mobile DDR (mDDR), etc. The example media database 110 may additionally or alternatively be implemented by one or more mass storage devices such as hard disk drive(s), compact disk drive(s), digital versatile disk drive(s), etc. While in the illustrated example the media database 110 is illustrated as a single database, the media database 110 may be implemented by any number and/or type(s) of databases.

As described in detail below in connection with FIG. 2, the example digital recording/playback device 104 performs speed-enhanced playback of recorded media. To facilitate the speed-enhanced playback of recorded media, the example digital recording/playback device 104 includes an example speed enhancer 112. The example speed enhancer 112 processes digital media recorded in the example media database 110 and identifies candidate audio frames for dropping. In some examples, the speed enhancer 112 allows a user to select a desired (e.g., target) speed-enhanced playback rate (e.g., 1.3×). The example speed enhancer 112 uses the desired speed-enhanced playback rate to determine a target number of frames to drop and selects a plurality of the candidate audio frames for dropping based on the target number of frames. During playback of the recorded media, the example speed enhancer 112 drops the selected audio frames and the corresponding video frames to perform speed-enhanced playback of recorded media. In some examples, the target number of frames to drop (e.g., 61 target frames) may be greater than the number of candidate frames identified for dropping (e.g., 60 candidate frames). In some such instances, the example speed enhancer 112 facilitates speed-enhanced playback of the recorded media at approximately the desired speed-enhanced playback rate.

Although examples disclosed herein are directed to television media broadcast using the ATSC standard, the techniques disclosed herein may be additionally or alternatively be applied to other forms of digital media that includes audio information in the form of AC-3 packets. For example, the disclosed techniques may be used to perform speed-enhanced playback of a podcast. Furthermore, the disclosed techniques may additionally or alternatively be used on digital media that includes audio information that includes skip bytes that are located in known positions in the audio packets.

Figure 2:
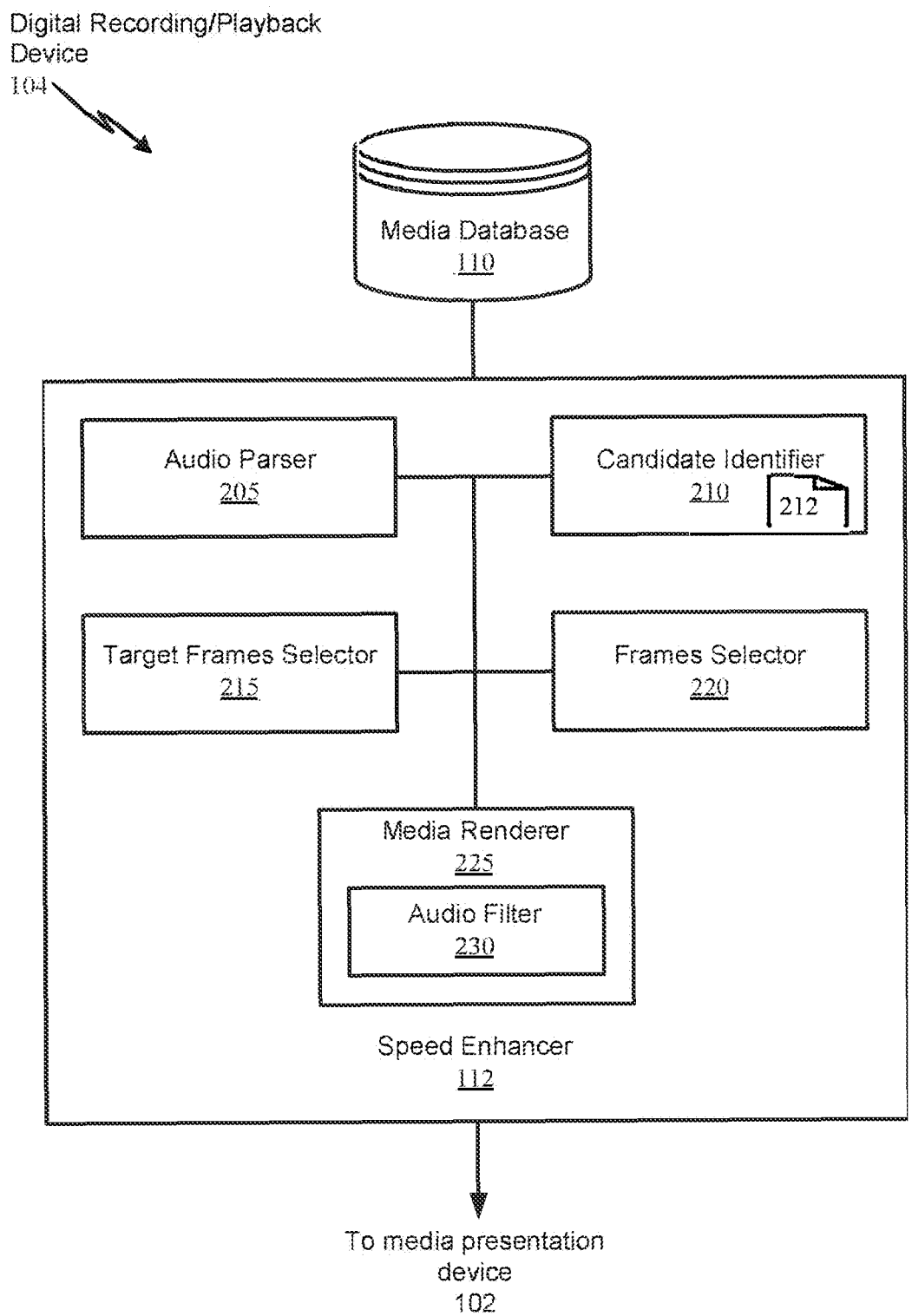
FIG. 2 is an example block diagram of an example implementation of an example digital recording/playback device included in the example system of FIG. 1.

FIG. 2 is a block diagram of an example implementation of the digital recording/playback device 104 of FIG. 1 including the example media database 110 to store recorded media and the example speed enhancer 112 to facilitate speed-enhanced playback of recorded media. In the illustrated example of FIG. 2, the speed enhancer 112 includes an example audio parser 205, an example candidate identifier 210, an example target frames calculator 215, an example frames selector 220, an example media renderer 225 and an example audio filter 230.

In the illustrated example of FIG. 2, the speed enhancer 112 performs speed-enhanced playback of recorded media by dropping audio frames (e.g., AC-3 frames) that have an excessive number of skip bytes (e.g., that satisfy a skip bytes threshold). Thus, the skip bytes represent a proxy for determining the "importance" of an audio frame. As an extreme case, if there is silence or a pause between bursts of speed, the corresponding audio frame will have a large number of skip bytes because a relatively few number of bits are required to represent the audio data (e.g., a large number of skip bytes are inserted into the audio frame to maintain the fixed size of the audio frame). In other examples, spectrally rich audio with significant energy will require a larger number of bits to represent its audio data (e.g., its MDCT coefficients) and the corresponding audio frame will contain very few skip bytes. By analyzing a sequence of audio frames (e.g., the audio frames included in recorded media), the example speed enhancer 112 computes a number of skip bytes included in each audio frame and determines a threshold (e.g. a target number of frames to drop) that will permit playback at a desired playback rate (e.g., 1.3×). For example, the example speed enhancer 112 may drop all frames with a number of skip bytes that satisfy a skip bytes threshold (e.g., 70 skip bytes). The example speed enhancer 112 also drops the corresponding video frames. As a result, the example digital recording/playback device 104 renders a fewer number of video frames and audio frames during playback. In some examples, the audio decoded from consecutive audio frames in instances where one or more audio frames have been dropped may result in audio discontinuities. The example speed enhancer 112 includes an audio filter to reduce the effects of such audio discontinuities during playback.

In the illustrated example of FIG. 2, the speed enhancer 112 includes the example audio parser 205 to parse compressed audio frames compliant with the AC-3 standard. For example, the audio parser 205 may select media from the media database 110 and count the number of audio frames included in the selected media. As is well-known, compressed audio bit streams compliant with the AC-3 standard typically include frames having one or more skip bytes, which are formed during the encoding process to maintain a fixed frame size for each AC-3 frame and which typically do not contain any useful information. An audio frame compliant with the AC-3 standard includes a "skip length exists" flag to indicate when the frame includes skip bytes and a "skip length" code that indicates the number of skip bytes included in the frame when the "skip length exists" flag is set to true. The example audio parser 205 takes advantage of the presence of these codes (e.g., the "skip length exists" flag and the "skip length" code) to identify audio frames that include skip bytes and the number of skip bytes included in the audio frame.

In the illustrated example of FIG. 2, the speed enhancer 112 includes the example candidate identifier 210 to identify audio frames that are candidate frames for dropping to facilitate speed-enhanced playback of media. In the illustrated example, the candidate identifier 210 determines whether an audio frame is a candidate frame for dropping based on the number of skip bytes included in the audio frame. In some examples, the candidate identifier 210 compares the number of skip bytes to a skip bytes threshold (e.g., 70 skip bytes). For example, the candidate identifier 210 may identify an audio frame as a candidate frame for dropping when the number of skip bytes included in the audio frame satisfies the skip bytes threshold (e.g., the audio frame includes at least 70 skip bytes). Thus, the example candidate identifier 210 identifies candidate frames for dropping without conducting a more detailed examination of the audio frame (e.g., without decompressing the audio frame). In the illustrated example, the candidate identifier 210 maintains a data structure 212 (e.g., a table, a list, a bit array, etc.) of candidate frames for dropping. In some examples, the candidate identifier 210 sorts the candidate frames in the data structure 212 based on the number of skip bytes included in the candidate frame. In some examples, the candidate identifier 210 determines a maximum speed-enhanced playback rate based on the total number of audio frames included in the media and the number of candidate frames for dropping included in the data structure 212 for the selected media.

In the illustrated example of FIG. 2, the speed enhancer 112 includes the example target frames calculator 215 to determine a target number of frames to drop to achieve speed-enhanced playback of recorded media. The example target frames calculator 215 of FIG. 2 calculates the target number of frames to drop (frames$_{target}$) based on a target playback rate (e.g., 1.3×) and the total number of audio frames in the selected media. For example, the target frames calculator 215 may utilize Equation 1 below to calculate the target number of frames to drop (frames$_{target}$). In some examples, the target frame calculator 215 may round the calculated target number of frames.

$$\text{frames}_{target} = \text{frames}_{total} - \frac{\text{frames}_{total}}{\text{rate}_{target}} \qquad \text{Equation 1}$$

In the illustrated example, the target frames calculator 215 receives the total number of audio frames (frames$_{total}$) from the audio parser 205. In Equation 1 above, the target playback rate (rate$_{target}$) is a default (e.g., preset) playback rate (e.g., 1.3×). However, in additional or alternate implementations, the target playback rate may be a user-provided playback rate.

In some examples, the target frames calculator 215 may additionally or alternatively calculate the target number of frames to drop (frames$_{target}$) in a "chunk" of audio rather than across the entire media. For example, the target frames calculator 215 may calculate the target number of frames to drop (frames$_{target}$) based on a subset number of frames of the media (e.g., 1,000 audio frames corresponding to 32 seconds of audio). For example, by applying Equation 1 above, the example target frames calculator 215 may calculate the target number of frames to drop (frames$_{target}$) in a 1,000 audio frame "chunk" is 330 frames to achieve a target playback rate (rate$_{target}$) of 1.3×.

In the illustrated example of FIG. 2, the speed enhancer 112 includes the example frames selector 220 to select candidate frames from the data structure 212 to drop during playback. In the illustrated example, the frames selector 220 obtains the target number of frames to drop (frames$_{target}$) from the target frames calculator 215 and selects the candidate frames in the data structure 212 based on the number of skip bytes included in the candidate frame. For example, the frames selector 220 may iteratively select the remaining candidate frames with the largest number of skip bytes until the target number of frames to drop is reached. In some examples, the frames selector 220 identifies the frames selected for dropping by flagging the selected frames in the data structure 212.

In some examples, the frames selector 220 selects frames for dropping in "chunks" of audio rather than across the entire media. For example, the frames selector 220 may select 330 for dropping in a 1,000 frame "chunk" of audio to achieve a target playback rate (rate$_{target}$) of 1.3× across the 1,000 frame "chunk."

In the illustrated example of FIG. 2, the speed enhancer 112 includes the example media renderer 225 to playback selected media at the target playback rate (e.g., 1.3×). For example, the media renderer 225 may obtain the selected media from the media database 110 and the data structure 212 including the frames identified for dropping by the frames selector 220. While rendering the media, the example media renderer 225 drops the selected frames, thereby reducing the time spent consuming the media and facilitating speed-enhanced playback of the recorded media. The example media renderer 225 also drops the corresponding video frame to retain lip synchronization.

In some examples, audio discontinuities may become apparent to a consumer due to audio frames being dropped by the media renderer 225 during media playback. For example, two audio frames that are non-consecutive during playback of media at the original playback rate (e.g., 1.0×) may be rendered by the media renderer 225 as consecutive audio frames during speed-enhanced playback of the media (e.g., at 1.3×). For example, during speed-enhanced playback of media including audio frames 1-3, the example media renderer 225 may drop audio frame 2, thereby resulting in the media renderer 225 rendering audio frame 3 after rendering audio frame 1. In the illustrated example of FIG. 2, the speed enhancer 112 includes the example audio filter 230 to apply a filter to audio during playback of the corresponding media to reduce these effects. For example, the audio filter 230 may be implemented using low-pass filters to smooth the audio during playback.

Figure 3:
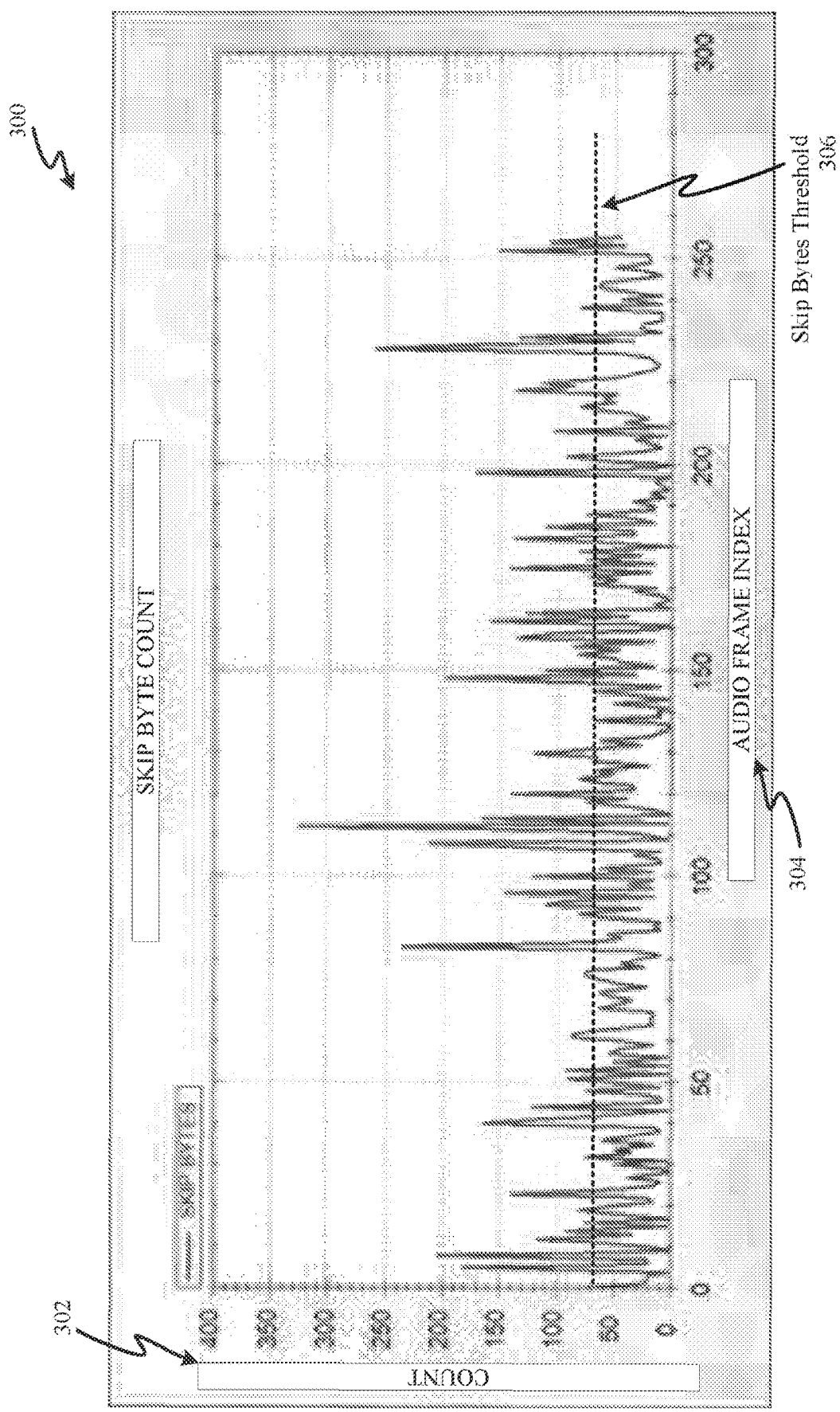
FIG. 3 is an example chart illustrating a distribution of skip byte counts detected in a sequence of audio frames.

FIG. 3 is an example chart 300 illustrating a distribution of skip byte counts 302 detected in a sequence of audio frames 304. The example sequence of audio frames 304 includes 256 audio frames. In the illustrated example, the sequence of audio frames 304 represents a male audio speech clip that was compressed at a bit rate of 192 kbps. The audio playback time for the illustrated clip is 8.192 seconds. In the illustrated chart 300 of FIG. 3, the values of the skip byte counts 302 range from 0 to 325. In the illustrated example, a skip bytes threshold 306 of 70 skip bytes is used to identify candidate frames for dropping and 61 audio frames satisfy the threshold 306 (e.g., the sequence of audio frames 304 includes 61 candidate frames for dropping). Thus, in the illustrated example, a maximum playback rate of thirty percent faster (e.g., 1.3×) than the original playback rate (e.g., 1.0×) may be achieved (e.g., 256/(256−61)=1.3). By performing speed-enhanced playback of the sequence of audio frames 304 at the maximum playback rate (e.g., 1.3×), the playback time can be reduced to 6.24 seconds. The speech is understandable in spite of the speed-enhanced playback because the removed frames are determined to be "unimportant" audio frames (e.g., silence or mostly silence) and only those frames that are considered "important" are retained (e.g., that have skip byte counts that satisfy the skip bytes threshold 306). The corresponding video frames are also dropped to maintain lip synchronization. In some examples, the skip bytes threshold 306 may be adjusted to improve the audio quality (e.g., by increasing the skip-bytes threshold or decreasing the desired speed-enhanced playback rate) or to decrease the audio quality (e.g., by decreasing the skip-bytes threshold or increasing the desired speed-enhanced playback rate).

While an example manner of implementing the digital recording/playback device 104 of FIG. 1 is illustrated in FIG. 2, one or more of the elements, processes and/or devices illustrated in FIG. 2 may be combined, divided, re-arranged, omitted, eliminated and/or implemented in any other way. Further, the example media database 110, the example speed enhancer 112, the example audio parser 205, the example candidate identifier 210, the example target frames calculator 215, the example frames selector 220, the example media renderer 225, the example audio filter 230 and/or, more generally, the example digital recording/playback device 104 of FIG. 1 may be implemented by hardware, software, firmware and/or any combination of hardware, software and/or firmware. Thus, for example, any of the example media database 110, the example speed enhancer 112, the example audio parser 205, the example candidate identifier 210, the example target frames calculator 215, the example frames selector 220, the example media renderer 225, the example audio filter 230 and/or, more generally, the example digital recording/playback device 104 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media database 110, the example speed enhancer 112, the example audio parser 205, the example candidate identifier 210, the example target frames calculator 215, the example frames selector 220, the example media renderer 225, the example audio filter 230 and/or, more generally, the example digital recording/playback device 104 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example digital recording/playback device 104 of FIG. 1 may include one or more elements, processes and/or devices in addition to, or instead of, those illustrated in FIG. 2, and/or may include more than one of any or all of the illustrated elements, processes and devices.

Figure 4:
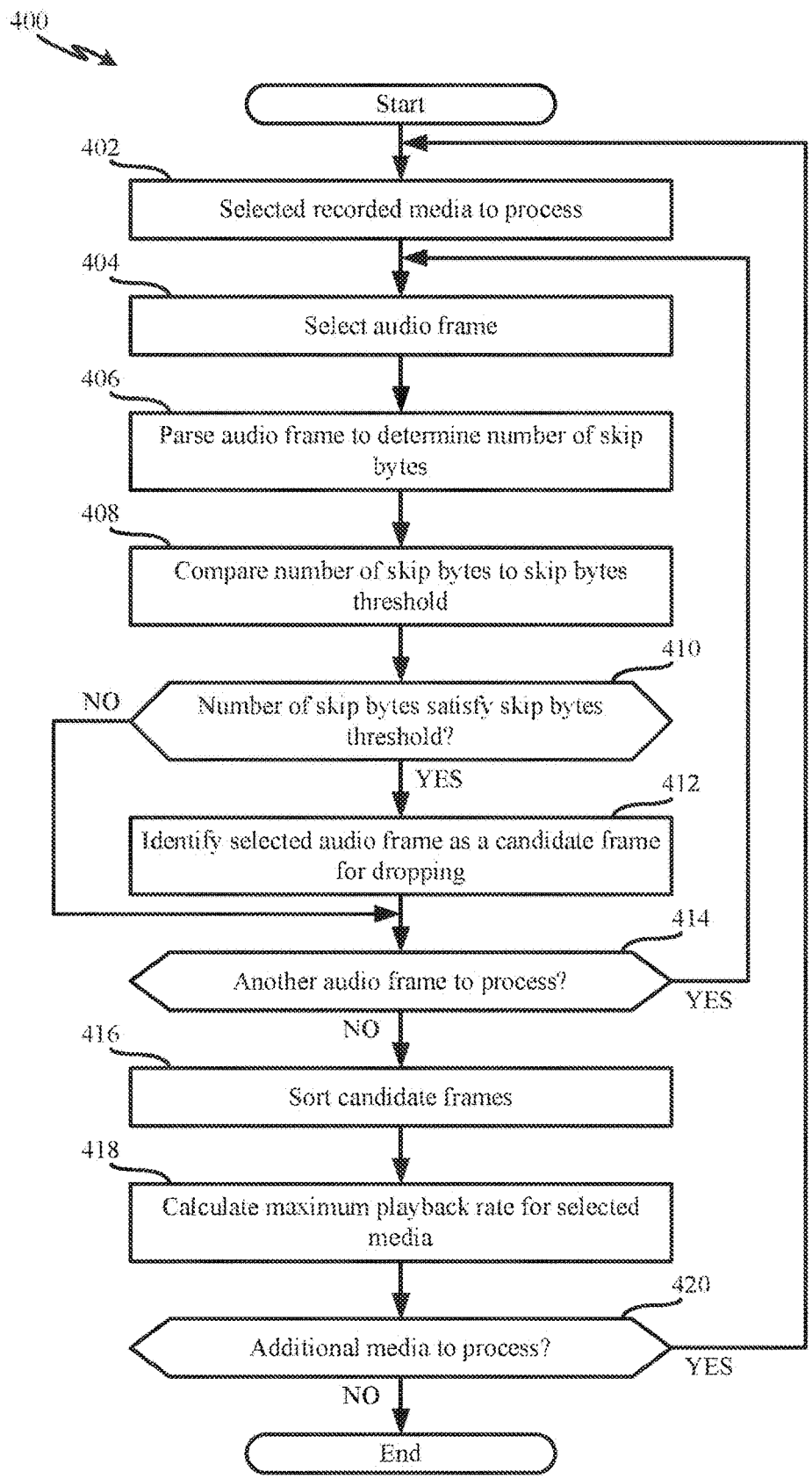
FIGS. 4 and/or 5 are flowcharts representative of example machine-readable instructions that may be executed by the example digital recording/playback device of FIG. 1 to perform speed-enhanced playback of recorded media.
Figure 5:
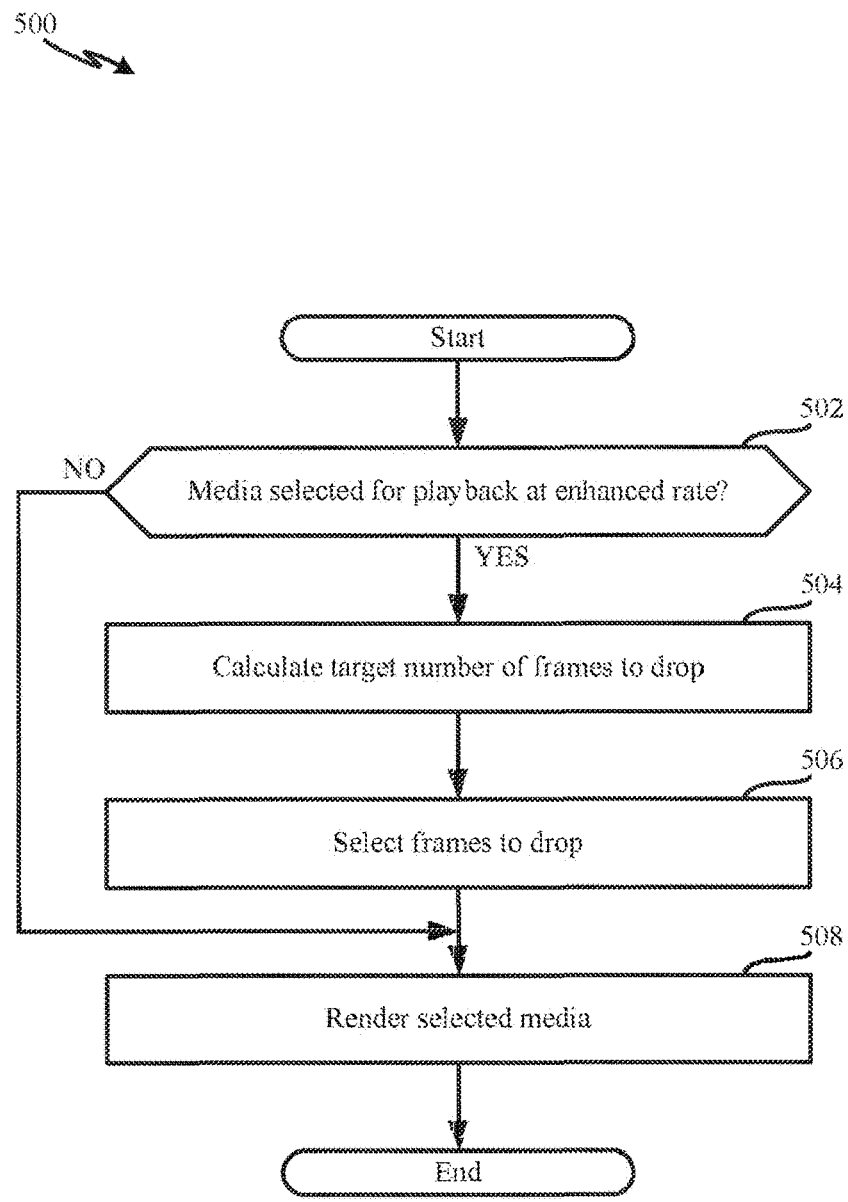

Flowcharts representative of example machine readable instructions for implementing the example digital recording/playback device 104 of FIGS. 1 and/or 2 are shown in FIGS. 4 and 5. In these examples, the machine readable instructions comprise programs for execution by a processor such as the processor 612 shown in the example processor platform 600 discussed below in connection with FIG. 6. The programs may be embodied in software stored on a tangible computer readable storage medium such as a CD-ROM, a floppy disk, a hard drive, a digital versatile disk (DVD), a Blu-ray disk, or a memory associated with the processor 612, but the entire programs and/or parts thereof could alternatively be executed by a device other than the processor 612 and/or embodied in firmware or dedicated hardware. Further, although the example programs are described with reference to the flowcharts illustrated in FIGS. 4 and/or 5, many other methods of implementing the example digital recording/playback device 104 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 4 is a flowchart representative of example machine-readable instructions 400 that may be executed by the example digital recording/playback device 104 of FIGS. 1 and/or 2 to facilitate speed-enhanced playback of recorded media. The example instructions 400 of FIG. 4 begin at block 402 when the example digital recording/playback device 104 selects recorded media to process. For example, the example speed enhancer 112 (FIG. 2) may obtain recorded media from the example media database 110. At block 404, the example speed enhancer 112 selects an audio frame to process. For example, the example audio parser 205 may select a compressed audio frame from the selected media to process. At block 406, the example speed enhancer 112 parses the selected audio frame to determine a number of skip bytes included in the audio frame. For example, the audio parser 205 may take advantage of the presence of the "skip length exists" flag and the "skip length" code to identify whether the selected audio frame includes skip bytes (e.g., via the "skip length exists" flag) and the number of skip bytes included in the audio frame (e.g., via the "skip length" code).

At block 408, the example speed enhancer 112 determines whether the selected audio frame is a candidate frame for dropping. For example, the example candidate identifier 210 may compare the number of skip bytes included in the selected audio frame to a skip bytes threshold. If, at block 410, the candidate identifier 210 determines that the number of skip bytes included in the selected audio frame does not satisfy the skip bytes threshold, then control proceeds to block 414 to determine whether there is another audio frame to process.

If, at block 410, the candidate identifier 210 determines that the number of skip bytes included in the selected audio frame satisfies the skip bytes threshold, then, at block 412, the example candidate identifier 210 determines that the selected audio frame is a candidate frame for dropping. For example, the candidate identifier 210 records a frame identifier representative of the selected audio frame and the number of skip bytes included in the selected audio frame in the example data structure 212.

At block 414, the example audio parser 205 determines whether there is another audio frame to process. If, at block 414, the audio parser 205 determines that there is another audio frame to process, control returns to block 404 to select the next audio frame to process.

If, at block 414, the audio parser 205 determines that there is not another audio frame to process, then, at block 416, the example speed enhancer 112 sorts the candidate frames included in the data structure 212. For example, the candidate identifier 210 may sort the candidate frames included in the data structure 212 based on the number of skip bytes included in the respective candidate frames.

At block 418, the example speed enhancer 112 calculates the maximum playback rate for the selected media. For example, the example candidate identifier 210 may determine the maximum playback rate for the selected media based on the total number of audio frames included in the media ($frames_{total}$) and the number of candidate frames for dropping included in the data structure 212 for the selected media.

At block 420, the example speed enhancer 112 determines whether there is additional recorded media in the media database 160 to process. If, at block 420, the example speed enhancer 112 determines that there is additional media to process, then control returns to block 402 to select another recorded media to process. If, at block 420, the example speed enhancer 112 determines that there is not additional media process, the example program 400 of FIG. 4 ends.

FIG. 5 is a flowchart representative of example machine-readable instructions 500 that may be executed by the example digital recording/playback device 104 of FIGS. 1 and/or 2 to perform playback of recorded media. The example instructions 500 of FIG. 5 begin at block 502 when the example digital recording/playback device 104 determines whether recorded media is selected for playback at an enhanced rate. For example, a user may select media to playback at an enhanced rate using an input interface in communication with the example digital recording/playback device 104 (e.g., via a remote, an input button, etc.). If, at block 502, the example digital recording/playback device 104 determines that recorded media is not selected for playback at an enhanced rate (e.g., is to playback at the original playback rate (e.g., 1.0×)), then control proceeds to block 408 to render the selected media.

If, at block 502, the digital recording/playback device 104 determines that recorded media is selected for playback at an enhanced rate, then, at block 504, the example speed enhancer 112 (FIG. 2) calculates a target number of frames to drop based on the selected enhanced playback. For example, the example target frames calculator 215 (FIG. 2) may use Equation 1 to calculate the target number of frames to drop. At block 506, the example speed enhancer 112 selects frames to drop to perform speed-enhanced playback of the selected media. For example, the example frames selector 220 (FIG. 2) may traverse the candidate frames included in the data structure 212 and select the candidate frames with the largest number of skip bytes until the target number of frames to drop is reached. In some examples, the frames selector 220 identifies the frames selected for dropping by flagging the selected frames in the data structure 212. At block 508, the example speed enhancer 112 renders the selected media. For example, during playback, the example media renderer 225 (FIG. 2) may drop candidate frames flagged for dropping by the frames selector 220. In some examples, the audio frames are processed by the example audio filter 230 to smooth audio artifacts that may occur due to dropping of audio frames. The example program 500 of FIG. 5 then ends.

Figure 6:
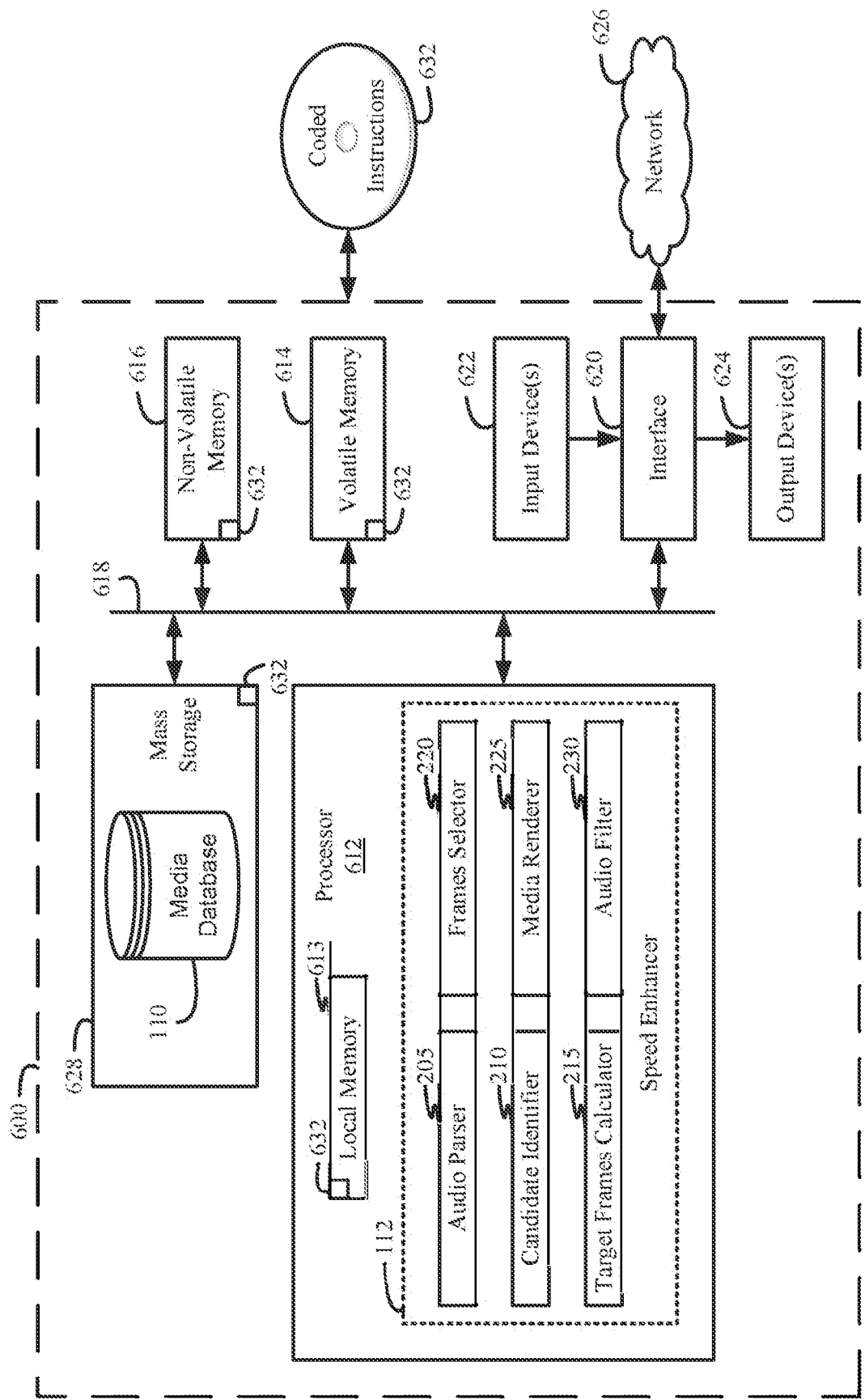
FIG. 6 is a block diagram of an example processing platform structured to execute the example machine-readable instructions of FIGS. 4 and/or 5 to implement the example digital recording/playback device of FIGS. 1 and/or 2.

FIG. 6 is a block diagram of an example processor platform 600 capable of executing the instructions of FIGS. 4 and/or 5 to implement the digital recording/playback device 104 of FIGS. 1 and/or 2. The processor platform 600 can be, for example, a server, a personal computer or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example executes the instructions to implement the example speed enhancer 112, the example audio parser 205, the example candidate identifier 210, the example target frames calculator 215, the example frames selector 220, the example media renderer 225 and the example audio filter 230. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage 628 implements the example media database 110.

The coded instructions 632 of FIGS. 4 and/or 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture perform speed-enhanced playback of recorded media. Examples disclosed herein perform the speed-enhanced playback of recorded media by dropping audio frames and the corresponding video frames during playback. To determine candidate audio frames for dropping, disclosed examples compare the number of skip bytes included in an audio frame to the skip bytes threshold. If the number of skip bytes included in the audio frame satisfies the skip bytes threshold, the audio frame is identified as a candidate frame for dropping. Thus, disclosed examples identify candidate frames for dropping without performing processor intensive steps of decompressing audio frames.

In some examples, whether a candidate frame is dropped during playback is determined based on a target playback rate and the total number of audio frames in the media. For example, disclosed examples may calculate a target number of frames to drop based on the target playback rate and the total number of audio frames in the media. Disclosed examples then iteratively select candidate frames to drop based on the number of skip bytes included in the candidate frame until the target number of frames to drop is satisfied. During playback of the media, disclosed examples drop the selected candidate frames and the corresponding video frames. Thus, disclosed examples improve on digital recording/playback devices by enabling speed-enhanced playback of recorded media. Because dropping audio frames may result in audio artifacts (e.g., skips) during playback, disclosed examples also filter the audio (e.g., via a low-pass filter) to smooth audio discontinuities, thereby providing an enjoyable media presentation to the user.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer-readable storage medium, having stored thereon program instructions that, upon execution by a processor, cause performance of operations comprising:
    identifying candidate audio frames to drop during speed-enhanced playback of media, each candidate audio frame identified based on a comparison of a number of skip bytes included in the candidate audio frame to a threshold; and
    performing the speed-enhanced playback of the media by dropping one or more of the identified candidate audio frames and one or more corresponding video frames.

2. The non-transitory computer-readable storage medium of claim 1, the operations further comprising:
    applying an audio filter to the media to reduce audio discontinuities during performance of the speed-enhanced playback of the media.

3. The non-transitory computer-readable storage medium of claim 1, wherein performing the speed-enhanced playback of the media by dropping the one or more of the identified candidate audio frames and the one or more corresponding video frames comprises rendering audio frames and corresponding video frames of the media other than the one or more of the identified candidate audio frames and the one or more corresponding video frames.

4. The non-transitory computer-readable storage medium of claim 1, the operations further comprising:
    determining a speed-enhanced playback rate based on a total number of audio frames included in the media and a number of the candidate audio frames, wherein performing the speed-enhanced playback of the media comprises performing the speed-enhanced playback of the media in accordance with the speed-enhanced playback rate.

5. The non-transitory computer-readable storage medium of claim 1, the operations further comprising:
receiving a user input indicating a user-selected speed-enhanced playback rate,
wherein performing the speed-enhanced playback of the media comprises performing the speed-enhanced playback of the media in accordance with the user-selected speed-enhanced playback rate.

6. The non-transitory computer-readable storage medium of claim 1, wherein identifying the candidate audio frames to drop during the speed-enhanced playback of the media comprises:
determining a number of skip bytes included in an audio frame of the media;
comparing the number of skip bytes to the threshold;
based on the number of skip bytes satisfying the threshold, identifying the audio frame as one of the candidate audio frames.

7. The non-transitory computer-readable storage medium of claim 1, wherein the processor is a processor of a media recording and playback device.

8. The non-transitory computer-readable storage medium of claim 1, wherein the media comprises a plurality of audio frames, the operations further comprising:
before identifying the candidate audio frames, sorting the plurality of audio frames based on numbers of skip bytes included in respective ones of the plurality of audio frames.

9. A computing system comprising:
a processor; and
a non-transitory computer-readable storage medium, having stored thereon program instructions that, upon execution by the processor, cause performance of operations comprising:
identifying candidate audio frames to drop during speed-enhanced playback of media, each candidate audio frame identified based on a comparison of a number of skip bytes included in the candidate audio frame to a threshold; and
performing the speed-enhanced playback of the media by dropping one or more of the identified candidate audio frames and one or more corresponding video frames.

10. The computing system of claim 9, the operations further comprising:
applying an audio filter to the media to reduce audio discontinuities during performance of the speed-enhanced playback of the media.

11. The computing system of claim 9, wherein performing the speed-enhanced playback of the media by dropping the one or more of the identified candidate audio frames and the one or more corresponding video frames comprises rendering audio frames and corresponding video frames of the media other than the one or more of the identified candidate audio frames and the one or more corresponding video frames.

12. The computing system of claim 9, the operations further comprising:
determining a speed-enhanced playback rate based on a total number of audio frames included in the media and a number of the candidate audio frames,
wherein performing the speed-enhanced playback of the media comprises performing the speed-enhanced playback of the media in accordance with the speed-enhanced playback rate.

13. The computing system of claim 9, the operations further comprising:
receiving a user input indicating a user-selected speed-enhanced playback rate,
wherein performing the speed-enhanced playback of the media comprises performing the speed-enhanced playback of the media in accordance with the user-selected speed-enhanced playback rate.

14. The computing system of claim 9, wherein identifying the candidate audio frames to drop during the speed-enhanced playback of the media comprises:
determining a number of skip bytes included in an audio frame of the media;
comparing the number of skip bytes to the threshold;
based on the number of skip bytes satisfying the threshold, identifying the audio frame as one of the candidate audio frames.

15. The computing system of claim 9, wherein the computing system is a media recording and playback device.

16. A method performed by a computing system, the method comprising:
identifying candidate audio frames to drop during speed-enhanced playback of media, each candidate audio frame identified based on a comparison of a number of skip bytes included in the candidate audio frame to a threshold; and
performing the speed-enhanced playback of the media by dropping one or more of the identified candidate audio frames and one or more corresponding video frames.

17. The method of claim 16, further comprising:
applying an audio filter to the media to reduce audio discontinuities during performance of the speed-enhanced playback of the media.

18. The method of claim 16, wherein performing the speed-enhanced playback of the media by dropping the one or more of the identified candidate audio frames and the one or more corresponding video frames comprises rendering audio frames and corresponding video frames of the media other than the one or more of the identified candidate audio frames and the one or more corresponding video frames.

19. The method of claim 16, further comprising:
determining a speed-enhanced playback rate based on a total number of audio frames included in the media and a number of the candidate audio frames,
wherein performing the speed-enhanced playback of the media comprises performing the speed-enhanced playback of the media in accordance with the speed-enhanced playback rate.

20. The method of claim 16, further comprising:
receiving a user input indicating a user-selected speed-enhanced playback rate,
wherein performing the speed-enhanced playback of the media comprises performing the speed-enhanced playback of the media in accordance with the user-selected speed-enhanced playback rate.

* * * * *